(12) United States Patent
Huang et al.

(10) Patent No.: US 7,782,340 B2
(45) Date of Patent: Aug. 24, 2010

(54) MULTIPLE VIDEO SIGNALS COEXISTING SYSTEM AND METHOD THEREOF

(75) Inventors: Wei-min Huang, Shijr (TW); Chien-hsing Liu, Shijr (TW)

(73) Assignee: Aten International Co., Ltd. (TW)

( * ) Notice: Subject to any disclaimer, the term of this patent is extended or adjusted under 35 U.S.C. 154(b) by 1079 days.

(21) Appl. No.: 11/456,457

(22) Filed: Jul. 10, 2006

(65) Prior Publication Data
US 2008/0007549 A1 Jan. 10, 2008

(51) Int. Cl.
*G09G 5/00* (2006.01)
(52) U.S. Cl. ...................................................... 345/629
(58) Field of Classification Search .................. 345/629, 345/630, 634, 635
See application file for complete search history.

(56) References Cited

U.S. PATENT DOCUMENTS

| | | | | |
|---|---|---|---|---|
| 4,360,831 A * | 11/1982 | Kellar | ................... | 348/585 |
| 5,265,202 A * | 11/1993 | Krueger et al. | ............... | 715/797 |
| 5,343,218 A * | 8/1994 | Maeda | ...................... | 345/641 |
| 5,523,958 A * | 6/1996 | Takeuchi | ................... | 348/571 |
| 5,602,565 A * | 2/1997 | Takeuchi | ................... | 345/634 |
| 5,896,131 A * | 4/1999 | Alexander | .................. | 345/634 |
| 6,833,841 B2 * | 12/2004 | Matsumoto | ................. | 345/634 |
| 7,061,456 B2 * | 6/2006 | Hiyama et al. | ............... | 345/87 |
| 7,119,815 B1 * | 10/2006 | Cahill, III | ................... | 345/629 |
| 7,164,779 B2 * | 1/2007 | Yerazunis et al. | ........... | 382/100 |
| 7,176,908 B2 * | 2/2007 | Matsubara et al. | .......... | 345/204 |
| 7,274,369 B1 * | 9/2007 | Bastos et al. | ................. | 345/531 |
| 2004/0257382 A1 * | 12/2004 | van der Zijpp | ............... | 345/629 |
| 2005/0184968 A1 | 8/2005 | Uchida et al. | | |
| 2006/0262138 A1 * | 11/2006 | Zhang | ........................ | 345/629 |
| 2006/0267993 A1 * | 11/2006 | Hunkins et al. | ............. | 345/502 |

FOREIGN PATENT DOCUMENTS

| | | |
|---|---|---|
| CN | 1604141 | 4/2005 |
| CN | 1620121 | 5/2005 |

* cited by examiner

*Primary Examiner*—Ryan R Yang
(74) *Attorney, Agent, or Firm*—Chen Yoshimura LLP

(57) ABSTRACT

Disclosed is a multiple video signals coexisting system and method thereof. The multiple video signals coexisting system includes a second switch and a first switch. The first switch outputs a portion of a first video signal and a portion of a second video signal from a plurality of video signals alternately as multiple coexisting video signals according to a selecting signal. The second switch generates the selecting signal according a toggle signal. The multiple video signals coexisting system further includes a pixel clock generator to generate a pixel clock and the second switch can employ the pixel clock to generate the selecting signal thereafter. The multiple video signals coexisting system outputs the multiple coexisting video signals for constituting continuous frames on a display, therefore, to show plural pictures on single display, and more particularly, to show an on-screen display menu translucently on the display.

32 Claims, 15 Drawing Sheets

MULTIPLE VIDEO SIGNALS COEXISTING SYSTEM AND METHOD THEREOF

FIELD OF THE INVENTION

The present invention generally relates to a multiple video signals coexisting system and method thereof, and more particularly to a multiple video signals coexisting system capable of outputting a plurality of video signals alternately for constituting continuous frames on a display.

BACKGROUND OF THE INVENTION

An on-screen display menu interface concept is raised for convenience of operation for a display setting or a keyboard-video-mouse switch system. However, the on-screen display menu appears opaquely when it is activated on a display. It has to cover a portion of the original picture shown on the display. Particularly, the on-screen display menu is usually set right at the centre on the display. Therefore, unable to see the whole picture to obtain the information disclosed on the display often bothers the users. Although, an on-screen display circuit having transparent function, which can solve the aforesaid issue has already been developed and well known to the public, such on-screen display circuit having transparent function is much more expensive to an ordinary one because the circuit design is much more complicated for realizing the transparent function. The transparent function of an on-screen display circuit may need lots of calculation, logic judgment and combination process for the video signals before outputting it to the displays.

More widely considering the exhibiting a plurality of pictures, preparing same number of displays for showing the same amount of pictures respectively will be unavoidable. In case that exhibiting two side elevational view pictures of two objects in same shooting way and trying to prove that one is taller than the other is the key of the exhibition and making two pictures coexist on one single display can provide a clear explanation of relation between two objects in different pictures. Consequentially, the best way is to show the two pictures simultaneously on single display for a convincible demonstration. Two robots are shown on single display comparatively to be fully understood when audiences glance at the display. Furthermore, showing two pictures simultaneously on one single display provides more possibility for multiple video signals process and application such as animations combination.

In consequence, there's a need to set forth a multiple video signals coexisting system and method thereof to output a plurality of video signals alternately for constituting continuous frames on a display.

SUMMARY OF THE INVENTION

To solve the foregoing drawbacks in the prior art, it is an objective of the present invention to provide a multiple video signals coexisting system and method thereof to output a plurality of video signals alternately for constituting continuous frames on a display.

Another objective of the present invention is to provide a multiple video signals coexisting system and method thereof to show one picture translucently with the other picture on a display.

To accomplish the above objectives, the present invention provides a multiple video signals coexisting system and method thereof. The multiple video signals coexisting system includes a first switch and a second switch. The first switch outputs a portion of a first video signal and a portion of a second video signal alternately for constituting continuous frames on the display according to a selecting signal. The second switch generates the selecting signal according to a toggle signal, included in the video signals. The toggle signal comprises a horizontal synchronization signal and a vertical synchronization signal.

The multiple video signals coexisting system further includes a micro controller to generate an enable signal to the second switch for starting to output the multiple coexisting video signals to the display. The multiple video signals coexisting system further includes a pixel clock generator. The pixel clock generator receives the horizontal synchronization signal and the vertical synchronization signal to generate a pixel clock for the second switch. Thereafter, the second switch can employ the pixel clock to generate the selecting signal based on the horizontal synchronization signal and the vertical synchronization signal for outputting the multiple coexisting video signals to the display. The multiple video signals coexisting system further includes an on-screen display (OSD) circuit, receiving the toggle signal to generate the second video signal. Furthermore, the on-screen display (OSD) circuit provides a range control signal to the second switch for outputting the second video signal in a predetermined range of each frame on the display.

The second switch further includes a first circuit unit, a second circuit unit and a selective third circuit unit. The first circuit unit receives the horizontal synchronization signal to generate the selecting signal for the first switch. The second circuit unit receives the vertical synchronization signal to generate an initial signal for the first circuit unit to determine the initial outputting a portion of the first and a portion of second video signals, respectively, for constituting each frame on the display. The third circuit unit receives the aforecited range control signal for outputting the second video signal in a predetermined range of each frame on the display. The first circuit unit can be a flip-flop. The second circuit unit may include a flip-flop and a 3-state buffer. Meanwhile, the third circuit unit can be a logic combination gate.

The present invention also provides a method for constituting continuous frames on a display with multiple coexisting video signals, the method including the steps of:

receiving a plurality of video signals;

generating the selecting signal for a first switch according to a toggle signal from toggle switcha second switch; and outputting the multiple coexisting video signals comprising a portion of a first video signal and a portion of a second video signal selected from the plurality of video signals for constituting the continuous frames on the display according to the selecting signal.

The method of present invention further includes a step of generating a pixel clock for the second switch base on the toggle signal to before the step of generating the selecting signal.

In case of that an on-screen display circuit is employed in the multiple video signals coexisting system, the method of present invention further includes a step of receiving the toggle signal by the on-screen display circuit to generate the second video signal before the step of receiving the video signals. Furthermore, the method includes a step of providing a range control signal to generate the selecting signal for outputting the second video signal in the predetermined range on the display before the step of generating the selecting signal. The method further includes a step of generating an initial signal according to the vertical synchronization signal to determine the initial outputting of the first and second video signals for constituting each frame on the display before the step of generating the selecting signal.

In conclusion, the present invention provides a multiple video signals coexisting system and method thereof to output a first video signal and a second video signal selected from a plurality of video signals alternately for constituting continuous frames on a display, therefore, capable of showing plural pictures on single display, or showing one picture translucently with the other picture on a display. More particularly, the multiple video signals coexisting system and method thereof is capable of showing an on-screen display menu translucently on the display for an on-screen display circuit.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENTS

Figure 1:
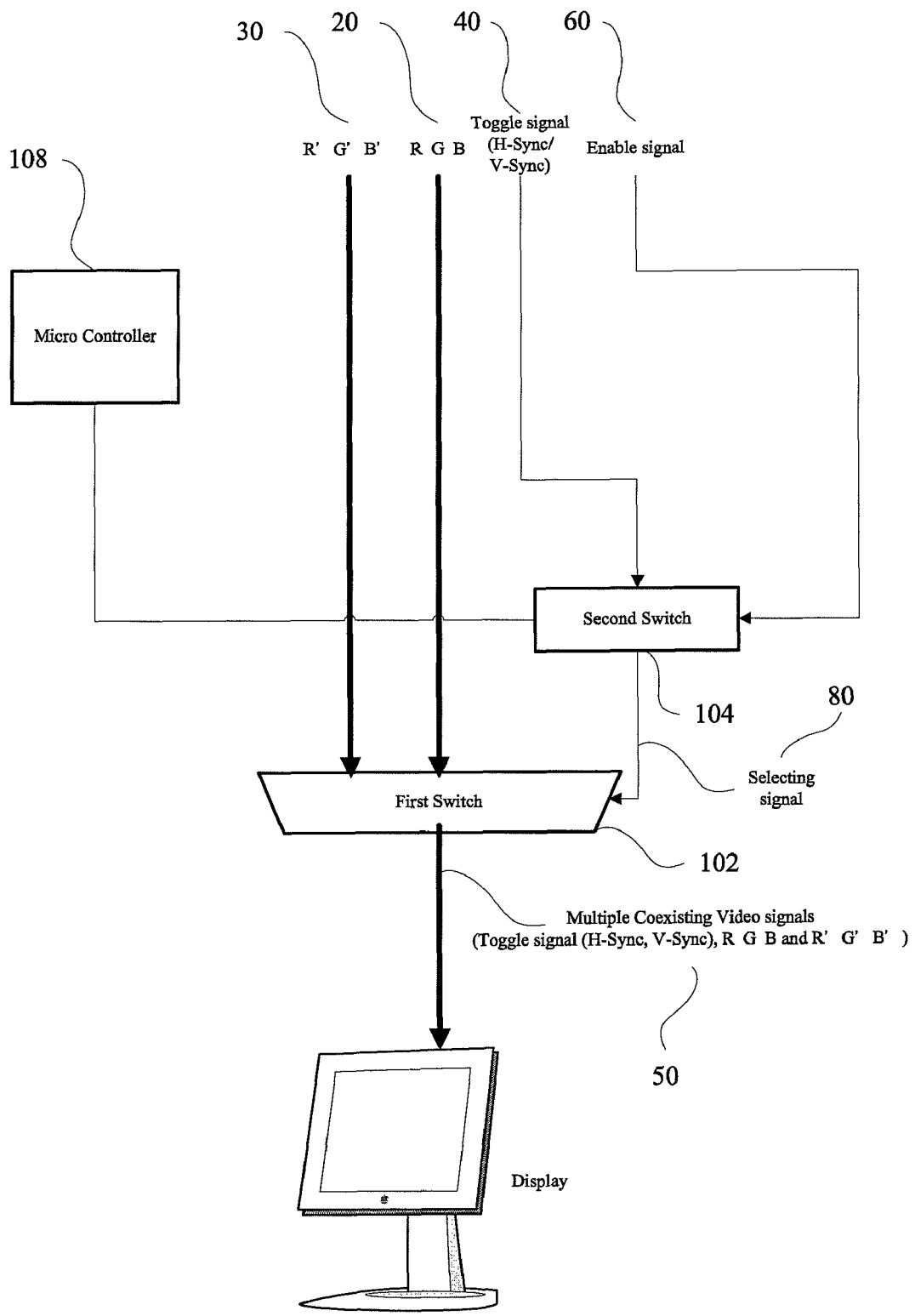
FIG. 1 illustrates a multiple video signals coexisting system according to a first embodiment of the present invention.

Please refer to FIG. 1, which illustrates a multiple video signals coexisting system according to a first embodiment of the present invention. The multiple video signals coexisting system includes at least a first switch 102 and a second switch 104. In the first embodiment, the multiple video signals coexisting system further include a micro controller 108. First, the multiple video signals coexisting system receives a first video signal (R, G, B) 20 and a second video signal (R', G', B') 30. Meanwhile, a toggle signal 40 extracted from the first video signals 20 or the second video signal 30 is transmitted to the second switch 104 at the same time. The second switch 104 receives the toggle signal 40 and generates a selecting signal 80 for the first switch 102. The first switch 102 outputs the first video signals (R, G, B) 20 and the second video signals (R', G', B') 30 alternately as multiple coexisting video signals 50 for constituting continuous frames on the display according to the selecting signal 80. The second switch 104 may need an enable signal 60 inputted externally for starting the constitution of the continuous frames with the multiple coexisting video signals 50. The enable signal 60 can be generated by the micro controller 108 according to a user's demand or directly generated by some trigger device by user's operation.

The toggle signal 40 can be a horizontal synchronization signal and a vertical synchronization signal extracted from the first video signals 20 or the second video signals 30. The horizontal synchronization signal and the vertical synchronization signal are employed to generate the aforesaid selecting signal 80 to control the first switch 102, switching to output a portion of the video signal 20 and a portion of the video signal 30 alternately in the way of scanning line by scanning line to constitute each frame according to the horizontal synchronization signal. Meanwhile, the initial outputting scanning line of the first video signals 20 and the second video signals 30 alternates in the way of frame by frame to constitute the continuous frames on the display according to the vertical synchronization signal. Practically, for realizing outputting a portion of the first video signals 20 and a portion of the second video signals 30 alternately, the present invention can provide a video image grabber unit, a video buffer and a video output controller to reproduce the first video signals 20 or the second video signals 30 before the first switch 104 to promote better picture quality.

Figure 2:
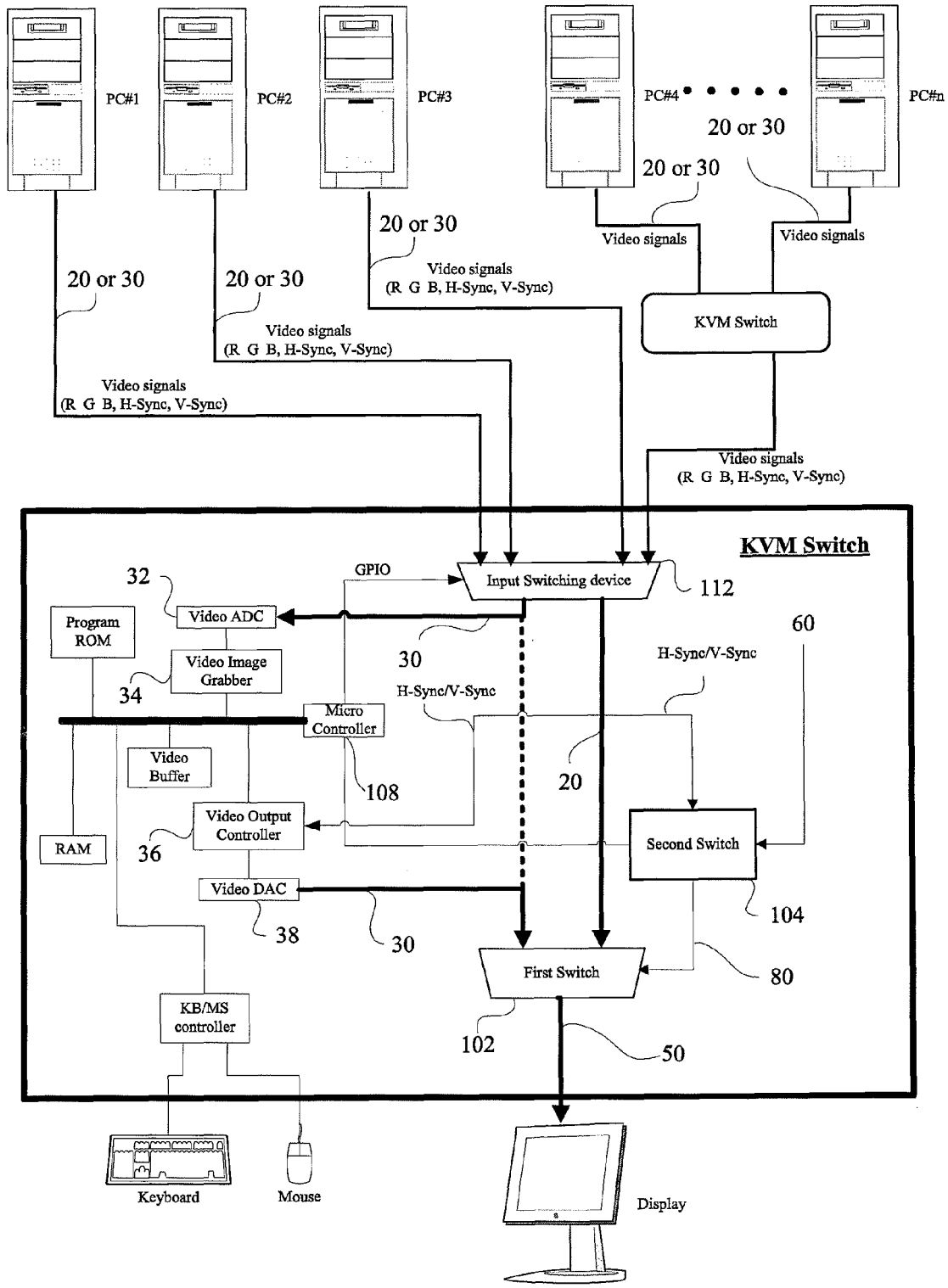
FIG. 2 illustrates a functional block diagram of the multiple video signals coexisting system in a keyboard-video-mouse switch system, which outputs a first video signal and a second video signal as multiple coexisting video signals according to the first embodiment of the present invention.

Please refer to FIG. 2, which illustrates a functional block diagram of the multiple video signals coexisting system embedded in a keyboard-video-mouse switch system, which outputs the first video signals 20 and second video signal 30 according to the first embodiment of the present invention. The keyboard-video-mouse (KVM) switch is coupled to a plurality of computers (PC#1~PC#n), receiving the first video signal and the second video signal from the selected two computers by the input switching device 112 according to a GPIO (General Purpose Input Output) commands from the micro controller 108. With the externally inputted enable signal 60, the second switch 104 starts receiving a toggle signal to generate the selecting signal 80 and transmit it to the first switch 102. The first switch 102 outputs a portion of the first video signal 20 and a portion of the second video signal 30 alternately as multiple coexisting video signals 50 in the way of scanning line by scanning line to constitute continuous frames according to the selecting signal 80. As a result, the user can select two pictures from any two computers to show portions of these two pictures simultaneously on his display as long as he needs.

As aforementioned for practical outputting two video signals as a coexisting video signal, basically, one of the first and second video signals 20, 30 (second video signal 30 as example) can transmitted through the broken line similarly as the first video signal 20 but for promoting better picture quality, the second video signals 30 can be transmitted through a video process line including a video ADC 32 (Analog to Digital Converter), a video image grabber 34, a video output controller 36 and a video DAC 38. The video ADC 32 converts the video signal 30. The video image grabber 34 grabs images of the video signal 30. The video output controller 36 receives the toggle signal 40 as same as the second switch 104 does for outputting (exactly, re-producing) the video signal 30 to the video DAC 38. The video DAC 38 transmits the video signal 30 to the first switch 102. Furthermore, the multiple video signals coexisting system can provide a video buffer for this video process line.

Figure 3:
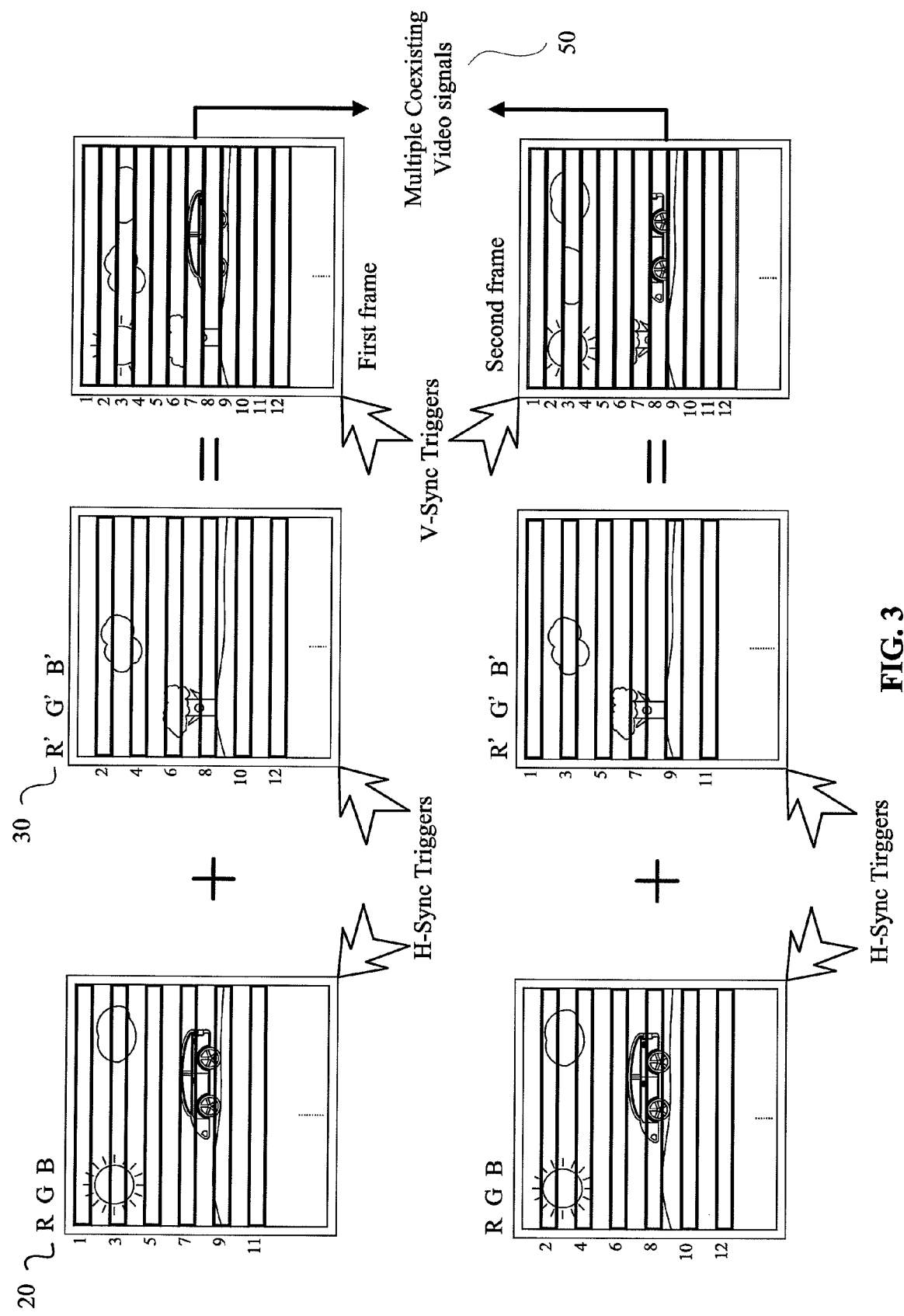
FIG. 3 illustrates a diagram of outputting the first video signal and the second video signal scanning line by scanning line for constituting continuous frames on the display by the multiple video signals coexisting system according to the present invention.

Please refer to FIG. 3, which illustrates a diagram of outputting a first video signals 20 (R, G, B) and a second video signals 30 (R', G', B') scanning line by scanning line as the multiple coexisting video signals 50 for constituting continuous frames on a display by the multiple video signals coexisting system according to the present invention. The upper column of the FIG. 3 shows that when a H-sync plus (as a trigger signal) is received, the first switch 102 outputs the scanning line 1 from the first video signal 20. When the next H-sync plus (as a trigger signal) is received, the first switch 102 outputs the scanning line 2 from the second video signal 30 and so on. Continuously, the first switch 102 outputs odd scanning lines from the first video signal 20 and even scanning lines from the second video signal 30 alternately to constitute the first frame. Furthermore, when a V-sync plus (as a trigger signal) is received, the outputting order of the first video signal 20 and the second video signal 30 is exchanged. The initial outputting scanning line for second frame is then determined to be the second video signal 30.

Thereafter, the lower column of the FIG. 3 shows that when a H-sync plus (as a trigger signal) is received, the first switch 102 outputs the scanning line 1 from the second video signal 30. When the next H-sync plus (as a trigger signal) is received, the first switch 102 outputs the scanning line 2 from the first video signal 20 and so on. Continuously, the first switch 102 outputs odd scanning lines from the second video signal 30 and even scanning lines from the first video signal 20 alternately to constitute the second frame. With constituting continuous frames in order of the first frame, the second frame and so on, showing the video signal 20 and the video signal 30 can be created as the multiple coexisting video signals 50 (VGA_OUT) on the display. Although, the example of two video signals coexisting is illustrated, three video signals or more coexisting on single display also can be achieved according to multiple video signals coexisting system of the present invention and method thereof.

Figure 4:
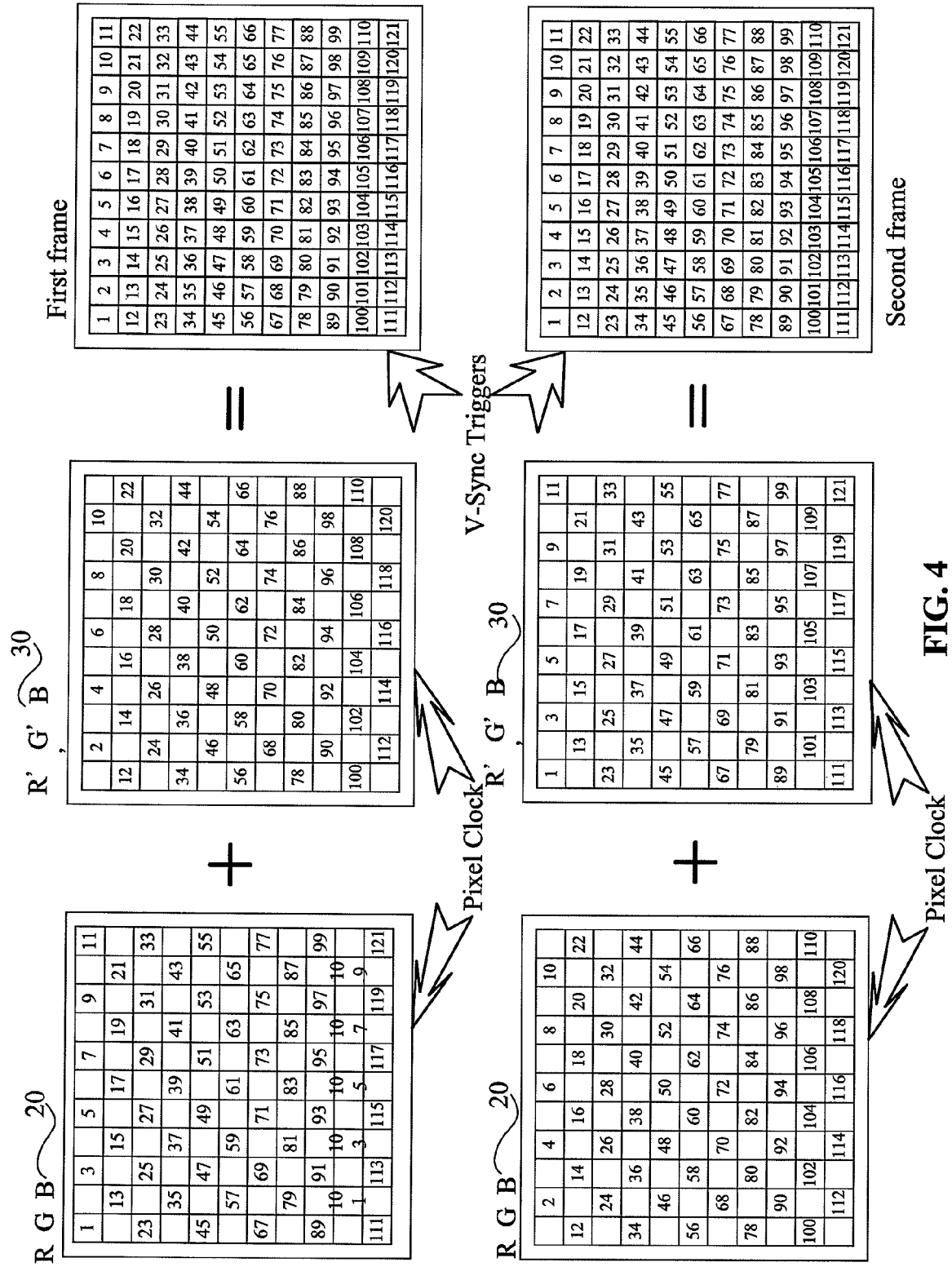
FIG. 4 illustrates a diagram of outputting the first video signal and the second video signal pixel by pixel for constituting continuous frames on the display by the multiple video signals coexisting system according to the present invention.

Please refer to FIG. 4, which illustrates a diagram of outputting the first video signal and the second video signal pixel by pixel for constituting continuous frames on the display by the multiple video signals coexisting system according to the present invention. In this figure, a frame having 121 pixels for explanation for simplification is illustrated. The upper column of the FIG. 4 shows that by a pixel clock trigger, the first switch 102 outputs the pixel 1 from the first video signal 20; by the next pixel clock trigger, the first switch 102 outputs the pixel 2 from the second video signal 30 and so on. Continuously, the first switch 102 outputs odd pixels from the first video signal 20 and even pixels from the second video signal 30 alternately to constitute the first frame. Furthermore, when a V-sync plus signal (as a trigger signal) is received, the outputting order of the first video signal 20 and the second video signal 30 is exchanged. The initial outputting pixel is then determined to be the second video signal 30.

Thereafter, the lower column of the FIG. 4 shows that when a H-sync plus signal (as a trigger signal) is received, the first switch 102 outputs the pixel 1 from the second video signal 30; when the next H-sync plus signal (as a trigger signal) is received, the first switch 102 outputs the pixel 2 from the first video signal 20 and so on. Continuously, the first switch 102 outputs odd pixels from the second video signal 30 and even pixels from the first video signal 20 alternately to constitute the second frame. With constituting continuous frames in order of the first frame, the second frame and so on, showing a portion of the video signal 20 and a portion of the video signal 30 can be created as the multiple coexisting video signals 50 (VGA_OUT) on the display. Although, the example of two video signals coexisting has been illustrated, three video signals or more coexisting on single display also can be achieved according to multiple video signals coexisting system of the present invention and method thereof.

Figure 5:
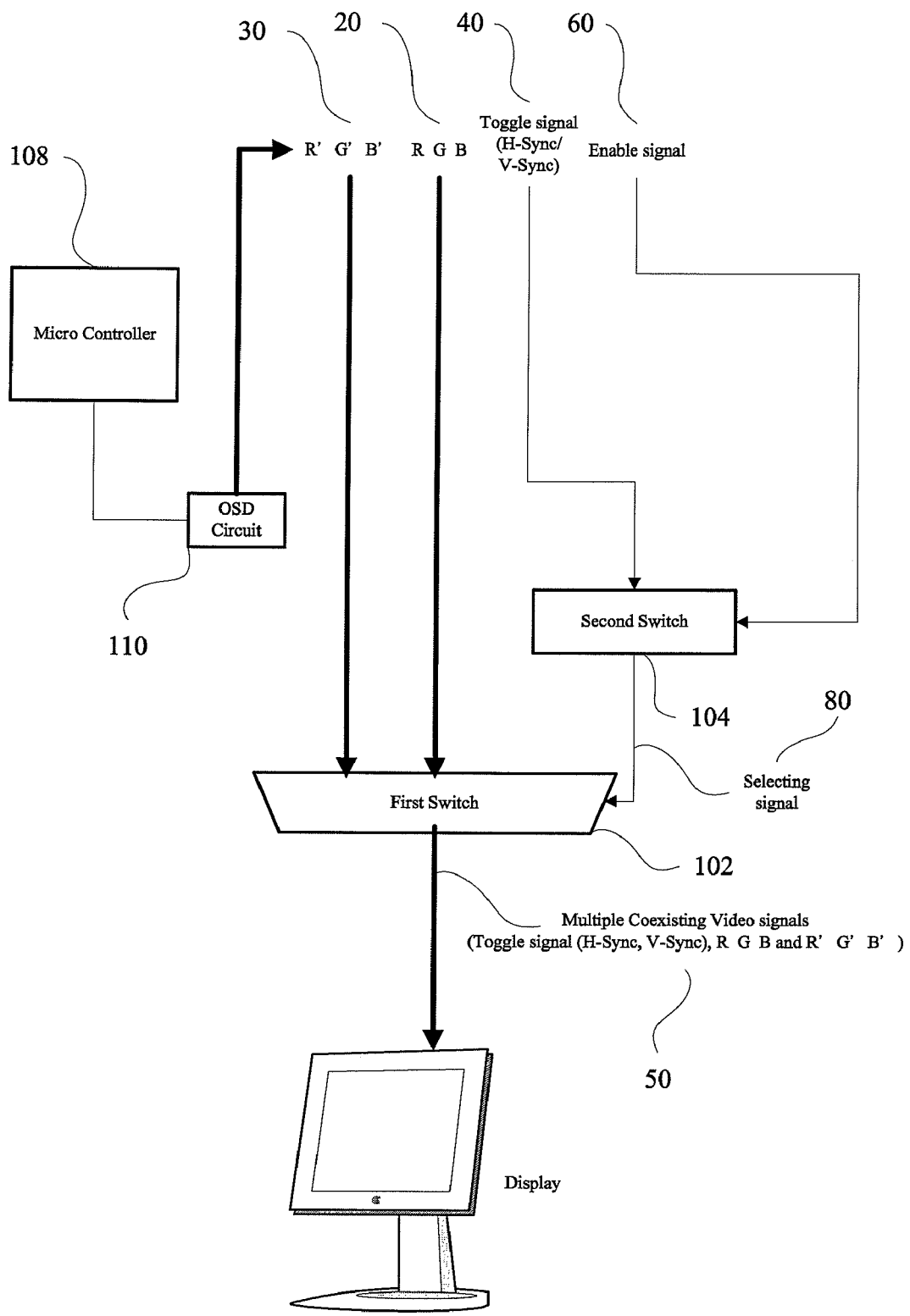
FIG. 5 illustrates a multiple video signals coexisting system according to a second embodiment of the present invention.

Please refer to FIG. 5, which illustrates a multiple video signals coexisting system according to a second embodiment of the present invention. Similar as the first embodiment, the multiple video signals coexisting system includes at least a first switch device 102 and a second switch 104. Furthermore, the multiple video signals coexisting system includes a micro controller 108 and an on-screen display (OSD) circuit 110. The on-screen display circuit 110 receives a horizontal synchronization signal and a vertical synchronization signal (toggle signal 40) may extracted from the first video signal 20 to generate the second video signal 30, constituting an OSD menu. Meanwhile, the toggle signal 40 is transmitted to the second switch 104. The second switch 104 receives the toggle signal 40 and generates a selecting signal 80 for the first switch 102. The first switch 102 switches to output a portion of the first video signal 20 and a portion of the second video signal 30 alternately in the way similarly described in the first embodiment as aforementioned. The second switch 104 may need an enable signal 60 inputted externally for starting the constitution of the continuous frames with the multiple coexisting video signals 50. The enable signal 60 can be generated by the micro controller 108 according to a user's demand or directly generated by some trigger device by user's operation.

Figure 6:
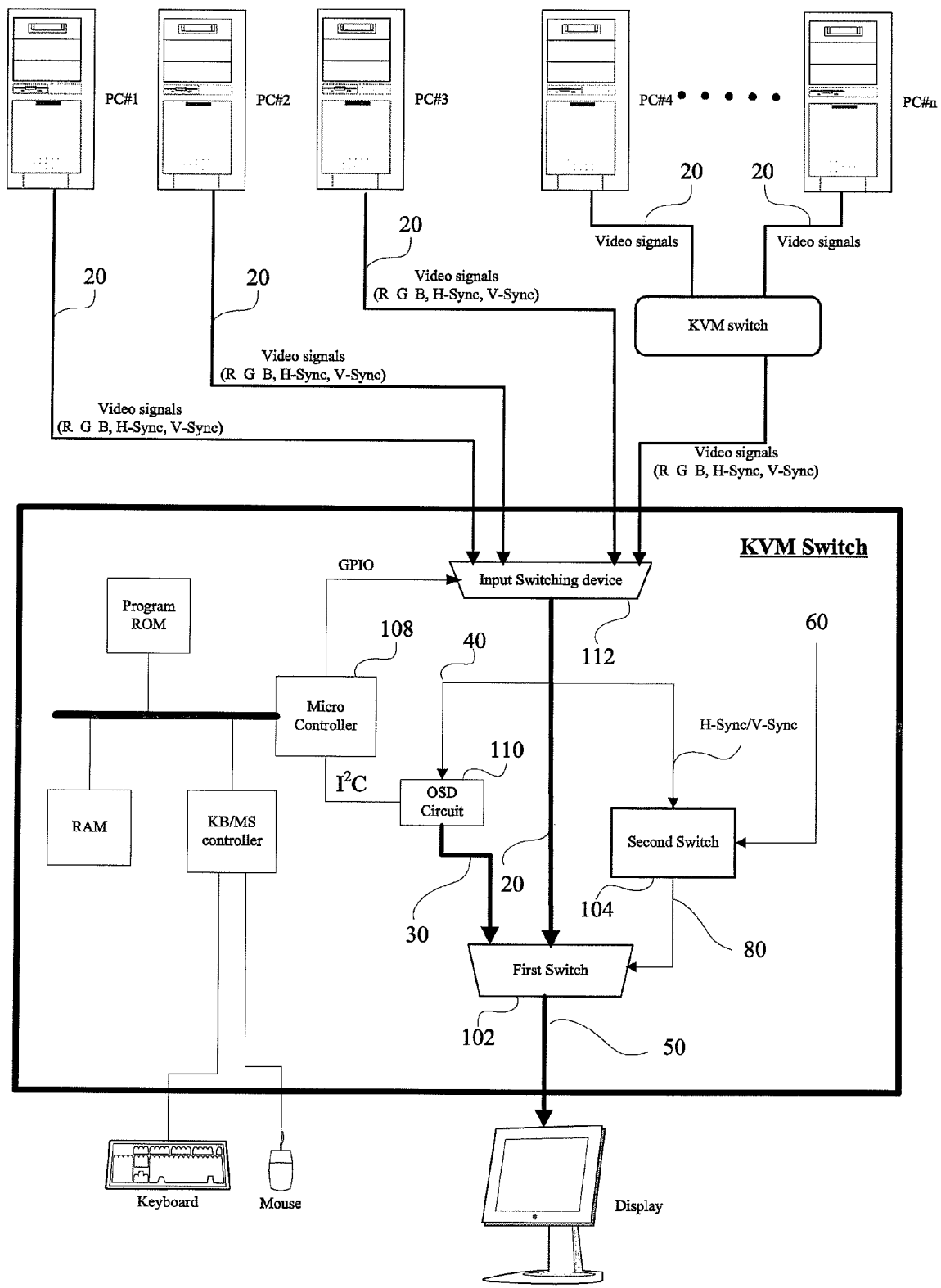
FIG. 6 illustrates a functional block diagram of the multiple video signals coexisting system in a keyboard-video-mouse switch system, which an on-screen display circuit generates the on-screen display menu signal as the second video signal according to the second embodiment of the present invention.

Please refer to FIG. 6, which illustrates a functional block diagram of the multiple video signals coexisting system embedded in a keyboard-video-mouse switch system, which an on-screen display circuit 110 generates the on-screen display menu signal as the second video signal 30 according to the second embodiment of the present invention. Similarly as described in the first embodiment, but the input switching device 112 receives the video signal 20 from one selected computer according to the GPIO (General Purpose Input Output) commands from the micro controller 108 and the video signal 20 is transmitted to the first switch 102.

The multiple video signals coexisting system in this second embodiment further includes an on-screen display (OSD) circuit 110 than the first embodiment. The toggle signal 40, which can be the horizontal synchronization signal and the vertical synchronization signal obeying the VESA standard, is transmitted to both of the second switch 104 and the on-screen display circuit 110. With the horizontal synchronization signal and the vertical synchronization signal, the on-screen display circuit 110 generates the second video signal 30 (an on-screen display menu signal) to the first switch 102; the second switch 104 generates the selecting signal 80 for controlling the first switch 102. The first switch 102 switches to output the first video signal 20 and the second video signal 30 alternately in the way similarly described in the first embodiment as aforementioned. As a result, the on-screen display circuit 110 having no transparent function can be promoted to achieve showing the on-screen display menu translucently with the original picture on the display with employing the multiple video signals coexisting system embedded in the KVM switch system.

Figure 7:
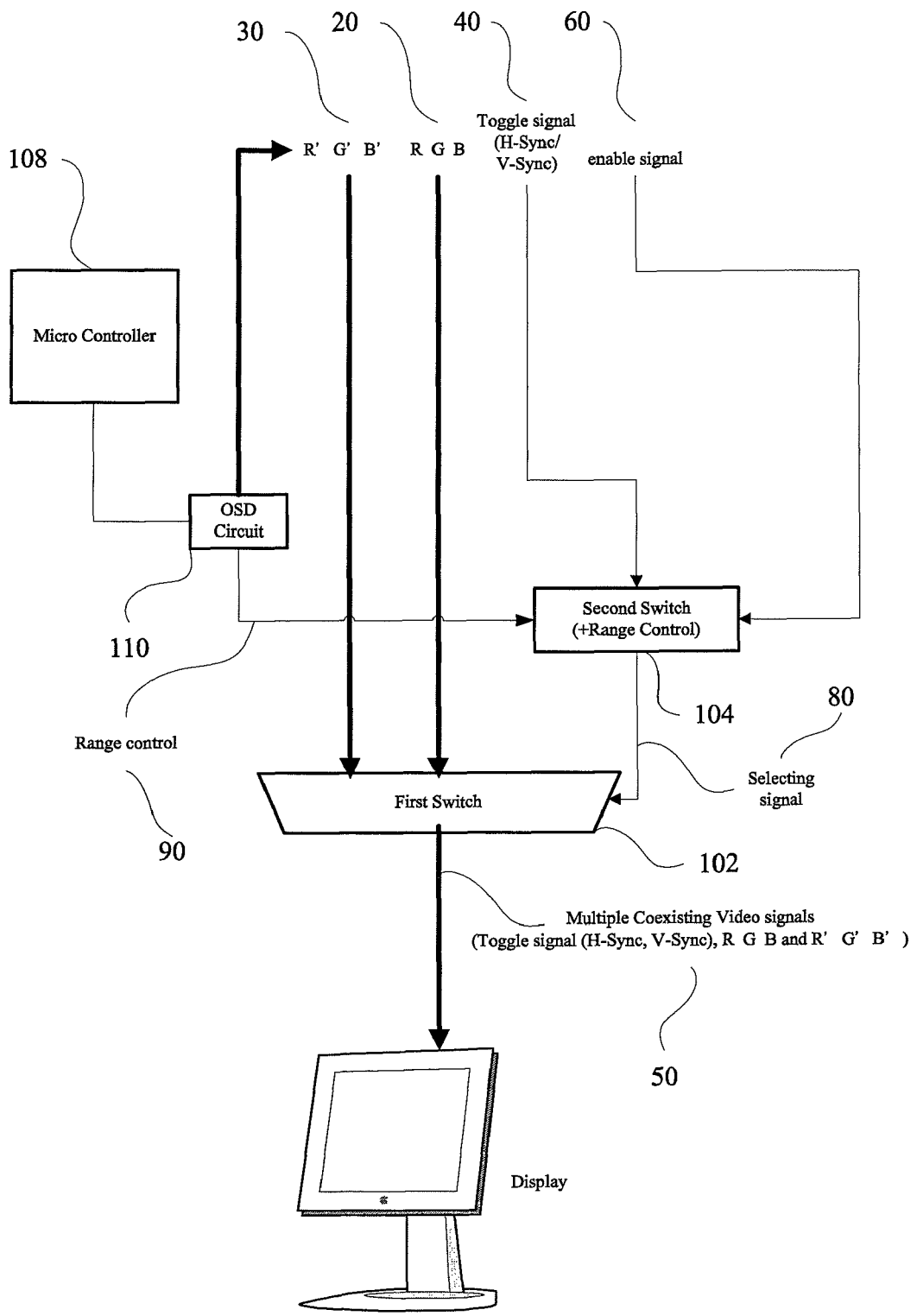
FIG. 7 illustrates a multiple video signals coexisting system according to a third embodiment of the present invention.

FIG. 7 illustrates a multiple video signals coexisting system according to a third embodiment of the present invention. Similar as the second embodiment, the multiple video signals coexisting system includes a first switch device 102, a second switch 104, a micro controller 108 and an on-screen display (OSD) circuit 110. Specifically, the second switch 104 of the multiple video signals coexisting system provides a range control function to output the on-screen display menu signal in a predetermined range of each frame on the display according to a range control signal 90 generated by the on-screen display circuit 110. The first switch 102 switches to output the first video signal 20 and the second video signal 30 alternately in the way similarly described in the first embodiment as aforementioned but only in the predetermined range of each frame, i.e. in the on-screen display menu area. The first switch 102 steadily outputs the first video signal 20 to the display outside the on-screen display menu area. The second switch 104 may need an enable signal 60 inputted externally for starting the constitution of the continuous frames with the multiple coexisting video signals 50. The enable signal 60 can be generated by the micro controller 108 according to a user's demand or directly generated by some trigger device by user's operation.

Figure 8:
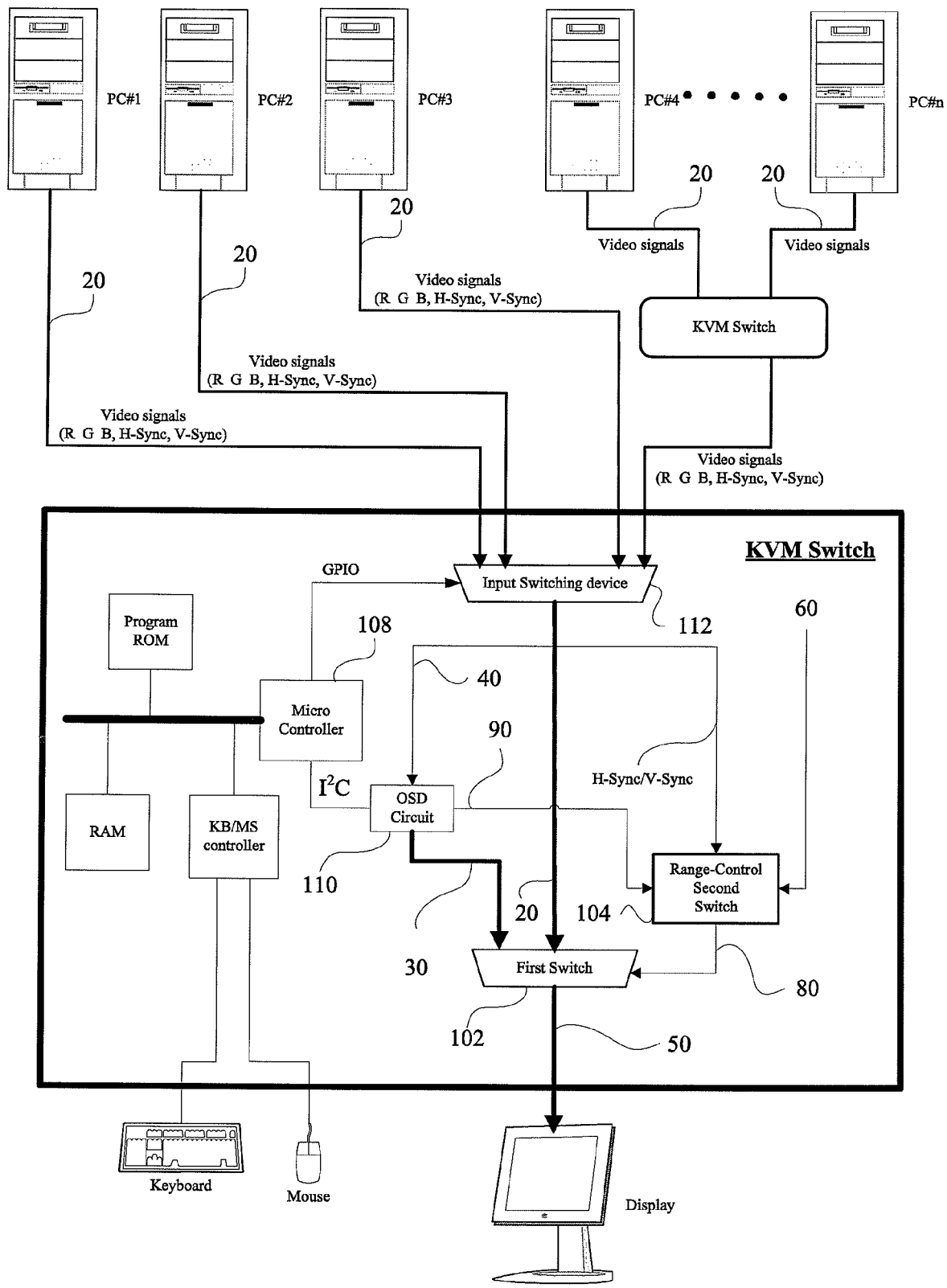
FIG. 8 illustrates a functional block diagram of the multiple video signals coexisting system in a keyboard-video-mouse switch system, which outputs the on-screen display menu signal in a predetermined range of each frame on the display according to the third embodiment of the present invention.
Figure 13:
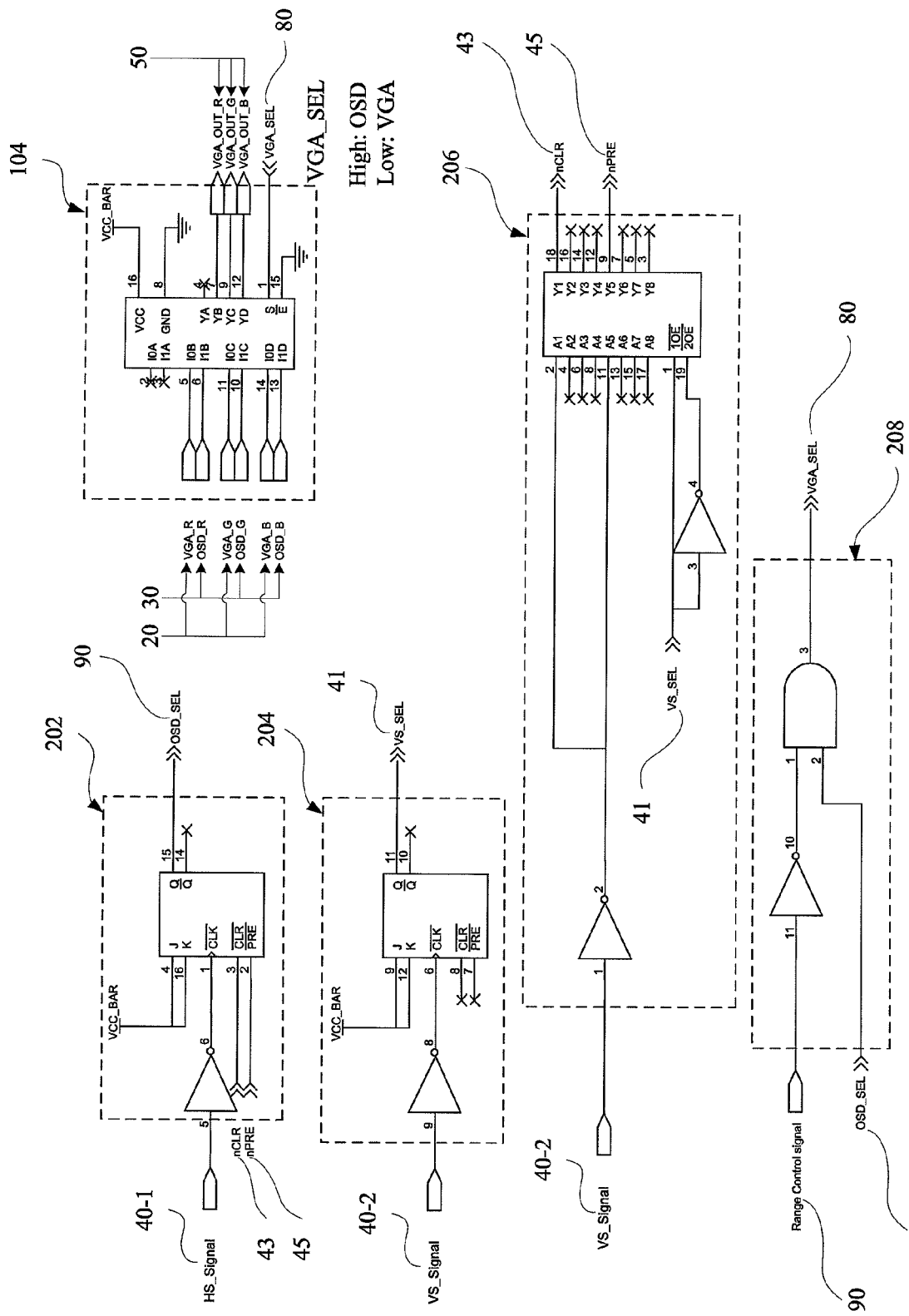
FIG. 13 shows circuit diagrams of the multiple video signals coexisting system according to the third embodiment of the present invention.

Please refer to FIG. 8. with FIG. 13. FIG. 8 illustrates a functional block diagram of the multiple video signals coexisting system in a keyboard-video-mouse switch system, which outputs the on-screen display menu signal in a predetermined range of each frame on the display according to the third embodiment of the present invention. In previous embodiments, the second switch 104 basically includes a first circuit unit 202 and a second circuit unit 204, 206, which will be mentioned in detail in FIG. 11. In this third embodiment, the second switch 104 further includes a third circuit unit 208. Moreover, the on-screen display circuit 110 generates a range control signal 90 to the second switch 104. The third circuit unit 208 of the second switch 104 is added for processing the range control signal 90 with the toggle signal 40 to generate the selecting signal 80 for the first switch 102. As a result, the first switch 102 switches to output the a portion of first video signal 20 and a portion of the second video signal 30 (an on-screen display menu signal) alternately in the way scanning line by scanning line in the predetermined range of each frame, i.e. in the on-screen display menu area according to the selecting signal 80. Outside the on-screen display menu area, the first switch 102 only outputs the first video signal 20 to the display. With the range control function of the third embodiment, Not only showing the on-screen display menu translucently with the original picture on the display can be achieved but also the quality and brightness of the original picture outside the on-screen display menu area can be promoted.

Figure 9:
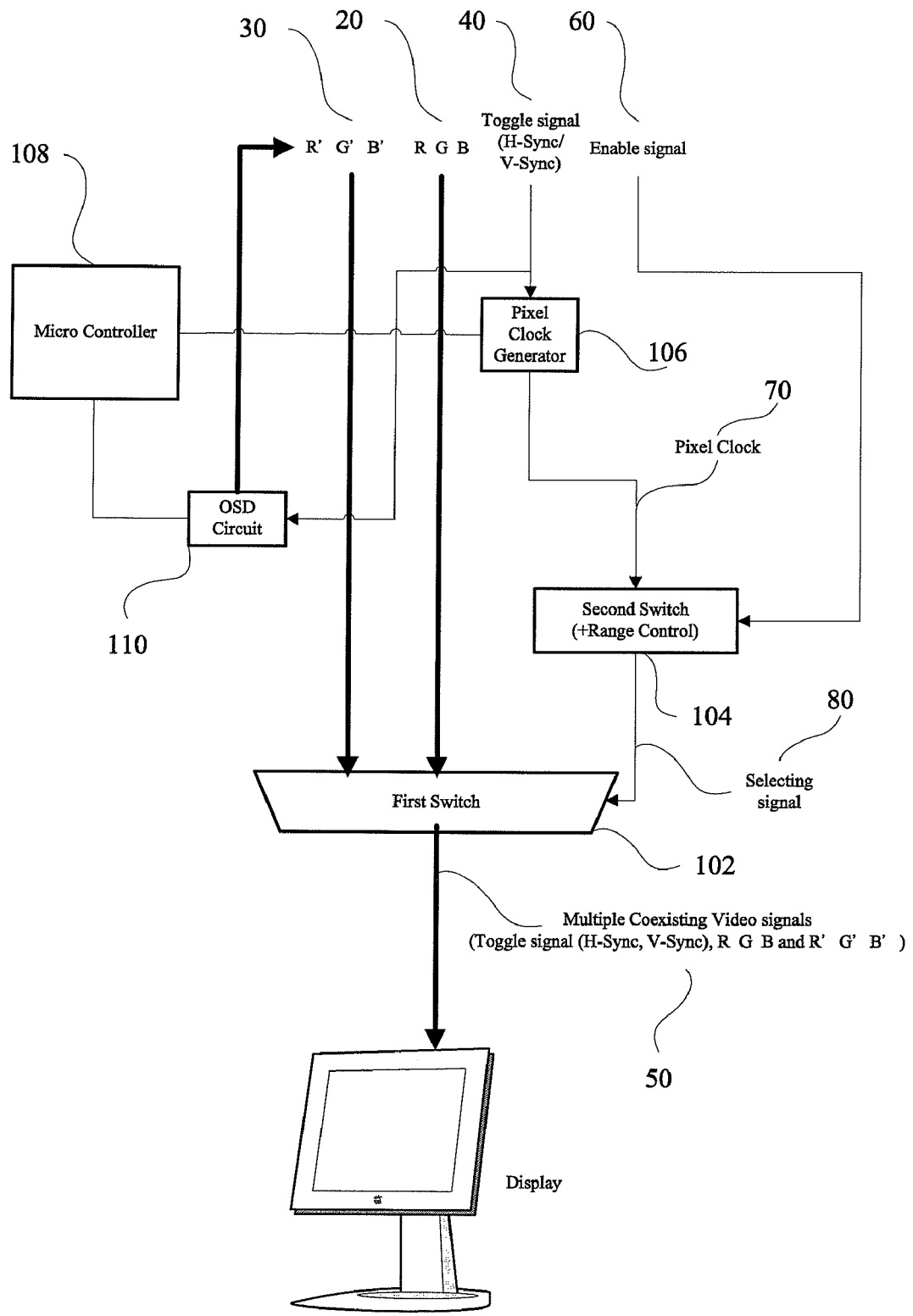
FIG. 9 illustrates a multiple video signals coexisting system according to a fourth embodiment of the present invention.

Please refer to FIG. 9, which illustrates a multiple video signals coexisting system according to a fourth embodiment of the present invention. Similar as the third embodiment, the multiple video signals coexisting system includes a first switch device 102, a second switch 104, a micro controller 108 and an on-screen display (OSD) circuit 110. Furthermore, the multiple video signals coexisting system includes a pixel clock generator 106. The pixel clock generator 106 receives the horizontal synchronization signal and the vertical synchronization signal to generate a pixel clock 70 for the second switch 104. The second switch 104 employs the pixel clock 70 to generate the selecting signal 80.

Figure 10:
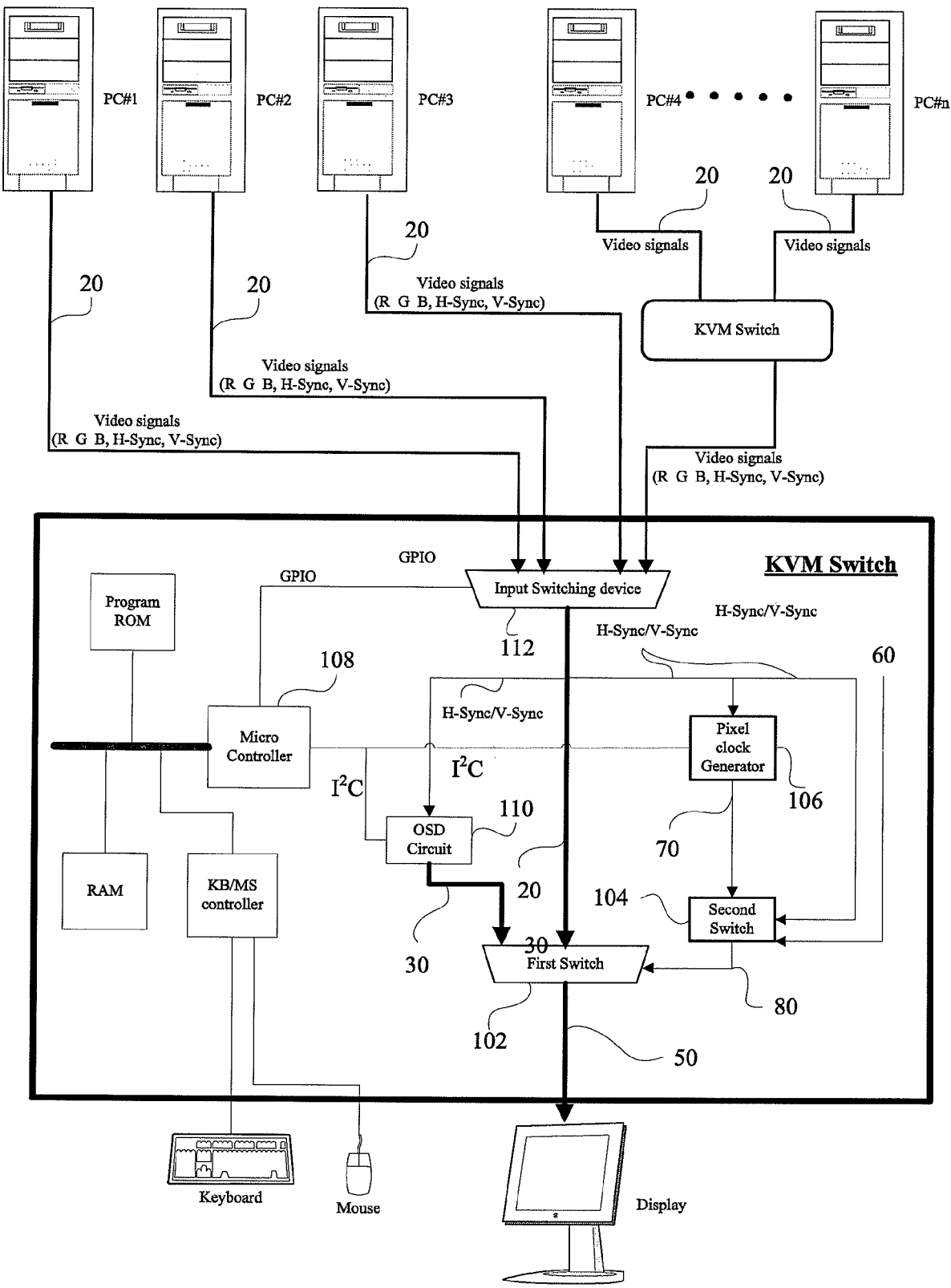
FIG. 10 illustrates a functional block diagram of the multiple video signals coexisting system in a keyboard-video-mouse switch system, which outputs the first video signal and the second video signal pixel by pixel alternatively according to the fourth embodiment of the present invention.

Please refer to FIG. 10, which illustrates a functional block diagram of the multiple video signals coexisting system in a keyboard-video-mouse switch system, which outputs the first video signal 20 and the second video signal 30 pixel by pixel alternatively according to the fourth embodiment of the present invention. In this fourth embodiment, the multiple video signals coexisting system further includes the pixel clock generator 106. The pixel clock generator 106 receives the horizontal synchronization signal and the vertical synchronization signal to generate a pixel clock 70 for the second switch 104. The second switch 104 generates the selecting signal 80 according to the pixel clock 70 for the first switch 102. As a result, the first switch 102 switches to output a portion of the first video signal 20 and a portion of the second video signal 30 alternately in the way of pixel by pixel to constitute each frame according to the selecting signal 80. Meanwhile, the initial outputting pixel of the first and second video signals 20 and 30 alternates in the way of frame by frame according to the vertical synchronization signal. Furthermore, this fourth embodiment can be combined with the third embodiment to provide a range control function for the on-screen display menu area to constitute the frames pixel by pixel.

Specifically, the second video signal 30 is illustrated with the on-screen display menu signal generated by the on-screen display circuit 110 in this embodiment, but as similarly described in the first embodiment, the first video signal 20 and second video signal 30 can be two selected video signals from different computers to be outputted to constitute each frame in the way of pixel by pixel.

Figure 11:
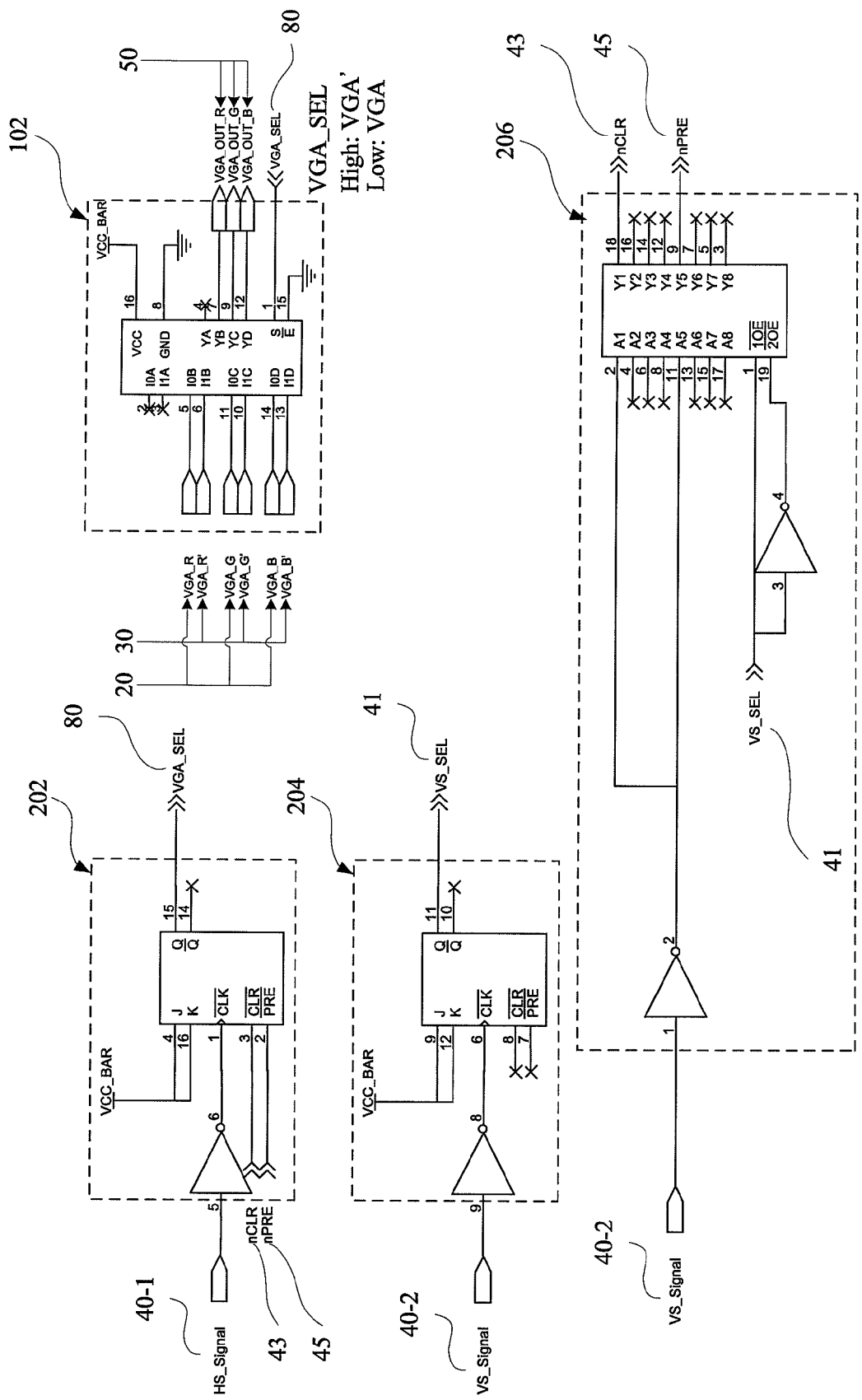
FIG. 11 shows circuit diagrams of the multiple video signals coexisting system according to the first and second embodiments of the present invention.
Figure 12:
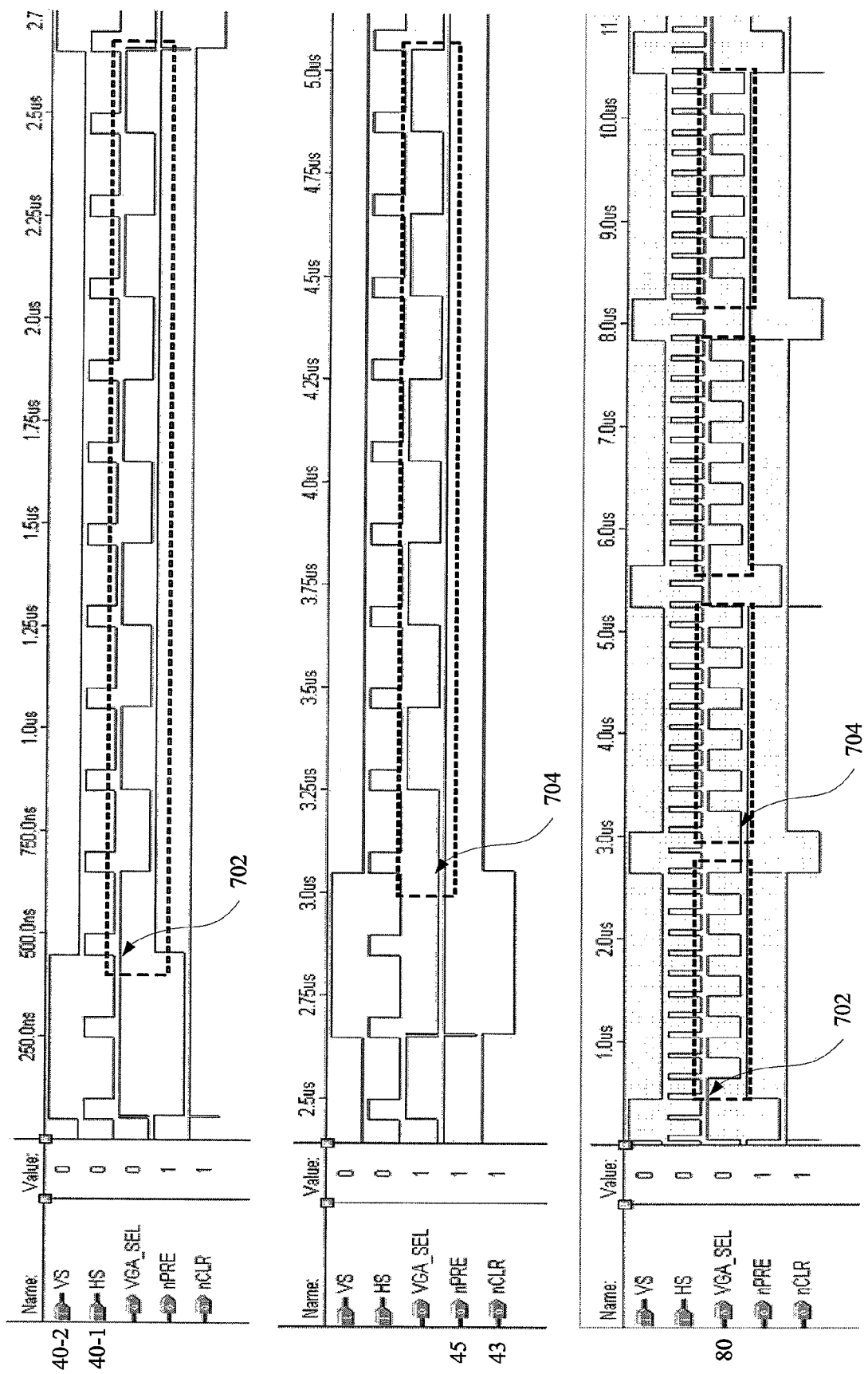
FIG. 12 shows waveform diagrams of the horizontal synchronization signal, the vertical synchronization signal, the initial signal and the selecting signal of the circuits shown in FIG. 11 according to the first and second embodiments of the present invention.

Please refer to FIG. 11 and FIG. 12. FIG. 11 shows the circuit diagrams of the multiple video signals coexisting system according to the first and second embodiments of the present invention. FIG. 12 shows the waveform diagrams of the horizontal synchronization signal 40-1, the vertical synchronization signal 40-2, the initial signal 43, 45 and the selecting signal 80 (VGA_SEL) generated by the circuits shown in FIG. 6 inside the second switch 104 according to the first and second embodiments of the present invention. The second switch 104 includes a first circuit unit 202 and a second circuit unit 204, 206. The first circuit unit 202 can be a frequency divider circuit or a flip-flop circuit to transform the pulses of the horizontal synchronization signal 40-1 into polarity switches pluses for generating the selecting signal 80 (VGA_SEL) to the first switch 102. When the VGA_SEL 80 is low, the first video signal 20 is outputted to the display; when the VGA_SEL 80 is high, the second video signal 30 is outputted to the display. The circuit 204 of the second circuit unit also can be a frequency divider circuit or a flip-flop circuit to transform the pulses of the vertical synchronization signal (VS_Signal) 40-2 into polarity switches pluses for generating the vertical synchronization select signal 41 (VS_SEL).

The VS_Signal 40-2 and the VS_SEL 41 are inputted to the circuit 206 of the second circuit unit. The circuit 206 of the second circuit unit can be a 3-state buffer to process the VS_Signal 40-2 and the VS_SEL 41 to obtain the initial signal (nCLR, nPRE) 43, 45 as the inputs to the first circuit unit 202. The first circuit unit 202 outputs the VGA_SEL 80 with the half frequency of the horizontal synchronization signal 40-1 as the waveforms shown in FIG. 12 for the first switch 102 to constitute continuous frames. Specifically, at the head of the broken line block 702 as shown in the top waveform diagram, which represents one frame constituted on the display for example, the nCLR 43 is high and the nPRE 45 is low, therefore, the VGA_SEL 80 in this frame starts with the high polarity. In another word, the first switch 102 outputs the second video signal 30 in odd scanning lines and outputs the first video signal 20 in even scanning lines to constitute this frame. Furthermore, at the head of the broken line block 704 as shown in the middle waveform diagram, which represents the next frame constituted on the display after the frame shown in the broken line block 702, the nCLR 43 is low and the nPRE 45 is high, therefore, the VGA_SEL 80 in this frame starts with the low polarity. In another word, the first switch 102 outputs the video signal (R, G, B) 20 in odd scanning lines and outputs the video signal (R', G', B') 30 in even scanning lines to constitute this frame.

By constituting continuous frames in the way of changing the initial outputting of the video signals 20, 30 alternatively as the multiple coexisting video signals 50 (VGA_OUT) to the display as shown in the low waveform diagram in FIG. 7, two video signals 20 and 30 coexisting on the display can be achieved.

Figure 14:
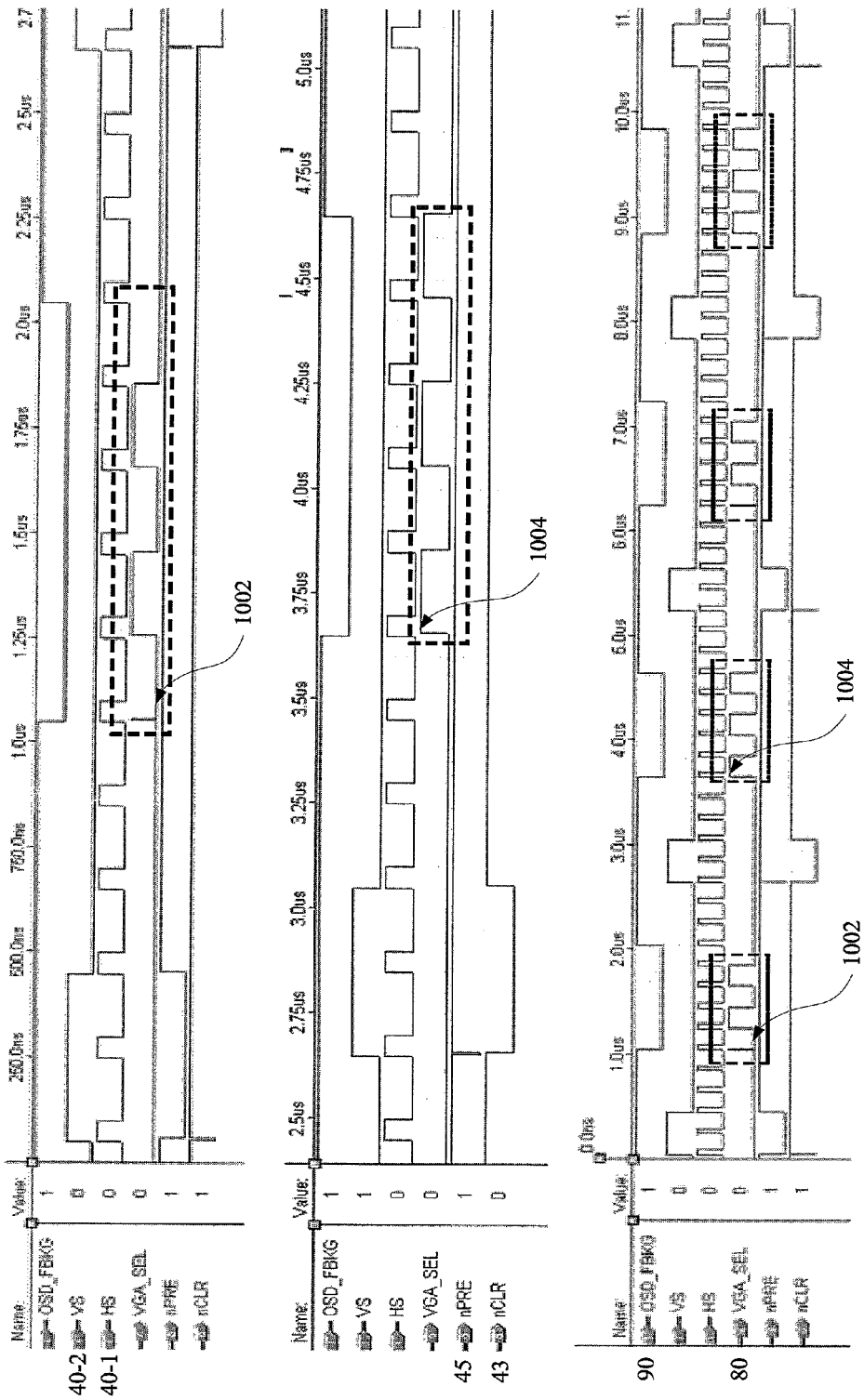
FIG. 14 shows waveform diagrams of the range control signal, the horizontal synchronization signal, the vertical synchronization signal, the initial signal and the selecting signal of the circuits shown in FIG. 13 according to the third embodiment of the present invention.

Please refer to FIG. 13 and FIG. 14. FIG. 13 shows the circuit diagrams of the multiple video signals coexisting system according to the third embodiment of the present invention. FIG. 14 shows the waveform diagrams of the range control signal 90, the horizontal synchronization signal 40-1, the vertical synchronization signal 40-2, the initial signal 43, 45 and the selecting signal 80 (VGA_SEL) generated by the circuits shown in FIG. 13 inside the second switch 104 according to the third embodiment of the present invention. The difference between the circuits of this third embodiment and the circuits inside the second switch 104 shown in FIG. 6 is adding a third circuit unit 208, coupled to the first circuit unit 202 and the first switch 102 respectively for processing the range control signal 90 (OSD_FBKG) to generate the selecting signal 80 (VGA_SEL).

The first circuit unit 202 can be a frequency divider circuit or a flip-flop circuit to transform the pulses of the horizontal synchronization signal 40-1 into polarity switches pluses for generating an on-screen display select signal 90 (OSD_SEL, i.e. the range control signal) to the third circuit unit 208. The third circuit unit 208 can be a logic combination gate to process the range control signal 90 (OSD_FBKG) and the on-screen display select signal 90 (OSD_SEL) to obtain the selecting signal 80 (VGA_SEL) for the first switch 102. When the VGA_SEL 80 is low, the first video signal 20 is outputted to the display; when the VGA_SEL 80 is high, the OSD menu signal 30 is outputted to the display. Similarly as the waveform diagram shown in FIG. 12, the third circuit unit 208 outputs the VGA_SEL 80 with the half frequency of the horizontal synchronization signal 40-1 as the waveforms shown in FIG. 14 for the first switch 102 to constitute continuous frames. Specifically, at the head of the broken line block 1002 as shown in the top waveform diagram, which represents the time period of constituting the OSD menu in one frame, the range control signal 90 (OSD_FBKG) is low, the first switch 102 outputs the first video signal 20 in odd scanning lines and outputs the OSD menu signal 30 in even scanning lines to constitute the predetermined range of each frame on the display, i.e. the OSD menu area. Furthermore, at the head of the broken line block 1004 as shown in the middle waveform diagram, which represents the time period of constituting the OSD menu in next frame after the frame shown in the broken line block 1002, the first switch 102 outputs the OSD menu signal 30 in odd scanning lines and outputs the first video signal 20 in even scanning lines to constitute the predetermined range of each frame on the display, i.e. the OSD menu area. Outside these blocks, the range control signal 90 (OSD_FBKG) is high and the selecting signal 80 (VGA_SEL) is low, the first switch 102 only outputs the first video signal 20 to the display.

Similarly as the first and second embodiments, by constituting the OSD menu area in continuous frames in the way of changing the initial outputting of the first video signal 20 and the OSD menu signal 30 alternatively for the OSD menu area of each frame but only outputting the first video signal 20 outside the OSD menu area as the multiple coexisting video signals 50 (VGA_OUT) to the display as shown in the low waveform diagram in FIG. 14, the first video signal 20 and the OSD menu signal 30 coexisting, i.e. the original picture and the on-screen display menu coexisting on the display can be achieved. With the range control signal 90 (OSD_FBKG), Not only showing the OSD menu translucently with the original picture on the display can be achieved but also the quality and brightness of the original picture outside the on-screen display menu area can be promoted.

Figure 15:
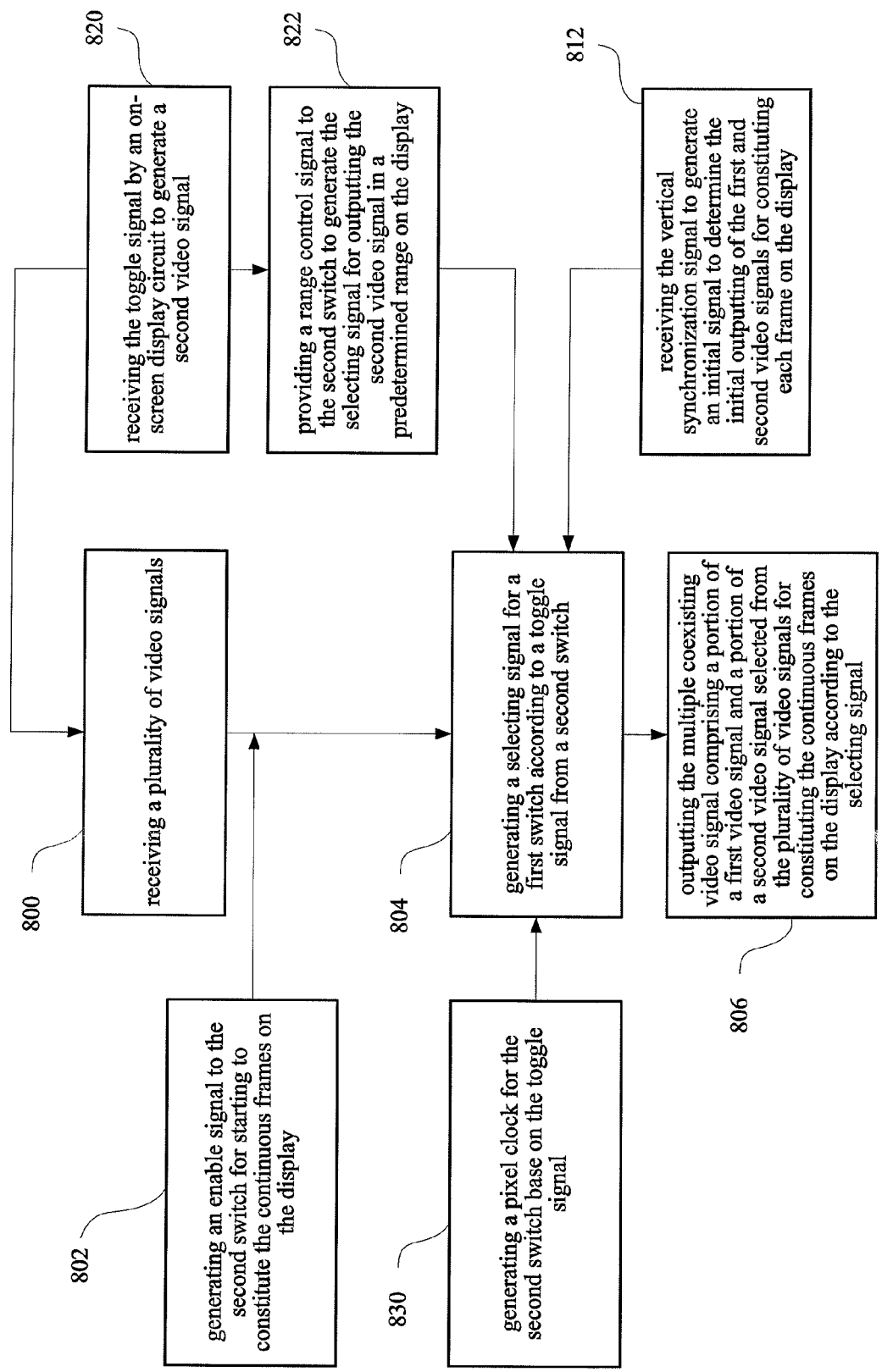
FIG. 15 shows a flowchart of the method for constituting continuous frames on a display the first video signal and the second video signal by a multiple video signal coexisting system according to the present invention.

Please refer to FIG. 15, which shows a flowchart of the method for constituting continuous frames on a display with a plurality of video signals by a multiple video signal coexisting system of the present invention.

The method for constituting continuous frames on a display with multiple coexisting video signals according to the first embodiment comprises the steps of:

Step 800, receiving a plurality of video signals;

Step 802, generating an enable signal to the second switch for starting to constitute the continuous frames on the display;

Step 804, generating a selecting signal for a first switch according to a toggle signal from a second switch; and Step 806, outputting the multiple coexisting video signals comprising a first video signal and a second video signal selected from the plurality of video signals for constituting the continuous frames on the display according to the selecting signal, wherein the selecting signal is generated with the received horizontal synchronization signal included in the toggle signal.

Furthermore, the method according to the first embodiment further comprises a step of:

Step 812, receiving the vertical synchronization signal to generate an initial signal to determine the initial outputting of the first and second video signals for constituting each frame on the display.

Compared with the first embodiment, the method for constituting continuous frames on a display with the multiple coexisting video signals according to the second embodiment further comprises a step of:

Step 820, receiving the toggle signal by an on-screen display circuit to generate the second video signal before the step of receiving the plurality of video signals.

Compared with the second embodiment, the method for constituting continuous frames on a display with the multiple coexisting video signals according to the third embodiment further comprises a step of:

Step 822, providing a range control signal to the second switch to generate the selecting signal for outputting the second video signal in a predetermined range on the display before the step of generating the selecting signal.

Compared with the first embodiment, the method for constituting continuous frames on a display with the multiple coexisting video signals according to the third embodiment further comprises a step of:

Step 830, generating a pixel clock for the second switch base on the toggle signal before the step of generating the selecting signal.

The multiple video signals coexisting system and method thereof according to the present invention outputs a first video signal and a second video signal alternately for constituting continuous frames on a display, therefore, capable of showing plural pictures on single display simultaneously, or showing one picture translucently with the other picture on a display, i.e. multiple video signals coexist on the single display. More particularly, the multiple video signals coexisting system and method thereof is capable of showing an on-screen display menu translucently on the display for an on-screen display circuit.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. A multiple video signals coexisting system for constituting continuous frames on a display, the system comprising:
   a first switch, outputting a portion of a first video signal and a portion of a second video signal alternately as multiple coexisting video signals for constituting continuous frames on the display according to a selecting signal;
   a second switch, generating the selecting signal according a toggle signal, wherein the toggle signal comprises a horizontal synchronization signal and a vertical synchronization signal; and
   a pixel clock generator, generating a pixel clock for the second switch based on the horizontal synchronization signal and the vertical synchronization signal.

2. The system of claim 1, further comprising a micro controller, generating an enable signal to the second switch for starting to constitute the continuous frames on the display.

3. The system of claim 1, wherein the second switch employs the pixel clock to generate the selecting signal for outputting the first and the second video signals alternately for constituting each frame on the display.

4. The system of claim 1, further comprising an on-screen display circuit, receiving the toggle signal to generate the second video signal.

5. The system of claim 4, wherein the on-screen display circuit provides a range control signal for the second switch to generate the selecting signal for outputting the second video signal generated in a predetermined range of each frame on the display.

6. The system of claim 1, wherein the second switch further comprises a first circuit unit, receiving the horizontal synchronization signal to generate the selecting signal for the first switch to output the multiple coexisting video signals for constituting the continuous frames on the display.

7. The system of claim 6, wherein the first circuit unit is a flip-flop.

8. The system of claim 6, wherein the second switch further comprises a second circuit unit, receiving the vertical synchronization signal to generate an initial signal for the first circuit unit to determine the initial outputting of the first and second video signals for constituting each frame on the display.

9. The system of claim 8, wherein the second circuit unit comprises a flip-flop and a 3-state buffer.

10. The system of claim 6, wherein the second switch further comprises a third circuit unit, coupled to the first circuit unit and the first switch, receiving a range control signal from an on-screen display circuit to generate the selecting signal for outputting the second video signal in a predetermined range of each frame on the display.

11. The system of claim 10, wherein the third circuit unit is a logic combination gate.

12. The system of claim 1, further comprising a video buffer, buffering the second video signal for outputting the portion of the first video signal and the portion of the second video signal synchronously.

13. A keyboard-video-mouse switch system capable of outputting multiple coexisting video signals for constituting continuous frames on a display, the system comprising:
   an inputting switching device, coupled to a plurality of computers, receiving a plurality of video signals from the computers;
   a first switch, outputting a portion of a first video signal and a portion of a second video signal selected from the plurality of video signals alternately for constituting the continuous frames on the display according to a selecting signal;
   a second switch, generating the selecting signal according to a toggle signal, wherein the toggle signal comprises a horizontal synchronization signal and a vertical synchronization signal; and
   a pixel clock generator, generating a pixel clock for the second switch based on the horizontal synchronization signal and the vertical synchronization signal.

14. The system of claim 13, further comprising a micro controller, generating an enable signal to the second switch for starting to constitute the continuous frames on the display.

15. The system of claim 13, wherein the second switch employs the pixel clock to generate the selecting signal to output the first and the second video signals alternately for constituting each frame on the display.

16. The system of claim 13, further comprising an on-screen display circuit, receiving the toggle signal to generate the second video signal.

17. The system of claim 16, wherein the on-screen display circuit provides a range control signal for the second switch to generate the selecting signal for outputting the second video signal in a predetermined range on the display.

18. The system of claim 13, wherein the second switch further comprises a first circuit unit, receiving the horizontal synchronization signal to generate the selecting signal for the first switch to output the first and second video signals alternately for constituting the continuous frames on the display.

19. The system of claim 18, wherein the first circuit unit is a flip-flop.

20. The system of claim 18, wherein the second switch further comprises a second circuit unit, receiving the vertical synchronization signal to generate an initial signal for the first circuit unit to determine the initial outputting of the first and second video signals for constituting each frame on the display.

21. The system of claim 20, wherein the second circuit unit comprises a flip-flop and a 3-state buffer.

22. The system of claim 18, wherein the second switch further comprises a third circuit unit, coupled to the first circuit unit and the first switch, receiving a range control signal from an on-screen display circuit to generate the selecting signal for outputting the second video signal in a predetermined range of each frame on the display.

23. The system of claim 22, wherein the third circuit unit is a logic combination gate.

24. The system of claim 13, further comprising a video buffer, buffering the second video signal for outputting the portion of the first video signal and the portion of the second video signal synchronously.

25. A method for constituting continuous frames on a display with multiple coexisting video signals, the method comprising the steps of:
receiving a plurality of video signals;
generating a selecting signal for a first switch according to a toggle signal from a second switch;
generating a pixel clock for the second switch base on the toggle signal; and
outputting the multiple coexisting video signals comprising a portion of a first video signal and a portion of a second video signal selected from the plurality of video signals for constituting the continuous frames on the display according to the selecting signal.

26. The method of claim 25, wherein the second switch employs the pixel clock to generate the selecting signal for outputting the first and the second video signals alternately for constituting each frame on the display.

27. The method of claim 25, further comprising a step of generating an enable signal to the second switch for starting to constitute the continuous frames on the display before the step of generating the selecting signal.

28. The method of claim 25, further comprising a step of receiving the toggle signal by an on-screen display circuit to generate the second video signal before the step of receiving the plurality of video signals.

29. The method of claim 28, further comprising a step of providing a range control signal to the second switch to generate the selecting signal for outputting the second video signal in a predetermined range on the display before the step of generating the selecting signal.

30. The method of claim 25, wherein the toggle signal comprises a horizontal synchronization signal and a vertical synchronization signal.

31. The method of claim 30, further comprising a step of receiving the vertical synchronization signal to generate an initial signal to determine the initial outputting of the first and second video signals for constituting each frame on the display before the step of generating the selecting signal.

32. The method of claim 25, further comprising a step of buffering the second video signal for outputting the portion of the first video signal and the portion of the second video signal synchronously after the step of receiving the video signals.

* * * * *